(12) United States Patent
Ho

(10) Patent No.: US 6,183,257 B1
(45) Date of Patent: Feb. 6, 2001

(54) TOUCH CONTROLLED LIGHT EMITTED TWO BALLS INSTRUMENT

(76) Inventor: Ping-Huang Ho, 122-5, Jun Liao Rd., Feng Yuan, Taichung Hsien (TW)

( * ) Notice: Under 35 U.S.C. 154(b), the term of this patent shall be extended for 0 days.

(21) Appl. No.: 09/277,555

(22) Filed: Mar. 29, 1999

(51) Int. Cl.[7] ................................................. G09B 27/08
(52) U.S. Cl. ........................ 434/131; 434/130; 434/136; 434/143; 434/145; 434/147; 362/809
(58) Field of Search ................................... 434/130, 131, 434/136, 143, 145, 147; 362/806, 808, 809

(56) References Cited

U.S. PATENT DOCUMENTS

| 5,545,041 | * | 8/1996 | Tsuzuki | 434/136 |
| 5,660,463 | * | 8/1997 | Ho | 362/280 |

OTHER PUBLICATIONS

Rand McNally Gloves, pp. 1–3. Rand McNally & Company, Mar. 1970.*

* cited by examiner

Primary Examiner—Robert A. Hafer
Assistant Examiner—Bena B. Miller

(57) ABSTRACT

The touch controlled light emitted two balls instrument comprises the following elements. A seat with a two loops touch controlled sensing switch circuit system, one side of the seat is formed with a pivotal hole, and the opposite side of the seat is installed with a through hole used to mounted with a first light source. A supporting frame is a cambered rod having an approximate C shape and is assembled on the pivotal hole of the seat. A screw rod is mounted on the top of the rod and an engaging rod is projected from the lower end thereof and may be pivotally connected with a second light source. A globe is a hollow and transparent round ball and a world map is depicted on the surface thereof, and holes are formed on the upper and lower ends thereof for being inserted by the screw rod and convex shaft of the supporting frame and a first light source. A heaven body ball is a transparent round ball with a hollow inner space, a heaven body map is depicted thereon. Holes are installed on the upper and lower ends thereof for being inserted by the fixing stud on the lower end of the engaging rod and for being passed through by the first light source and then the first light source will be positioned on the ball pad so to be assembled between the supporting frame and the seat. Therefore, by the touch controlled light emitting two balls instrument within the seat to control the switching of the two light sources, a four stages illumination effects will generate.

1 Claim, 4 Drawing Sheets

TOUCH CONTROLLED LIGHT EMITTED TWO BALLS INSTRUMENT

FIELD OF THE INVENTION

The present invention relates to touch controlled light emitted two balls instrument, and especially to ball instrument, wherein by a touch controlled electric switch, the terrestrial globe and heaven body ball will present various variations.

BACKGROUND OF THE INVENTION

A terrestrial globe is a tool for teaching, which is a miniature of a real globe. The maps of nations all over the world is depicted on the terrestrial globe so that people can know the geometry therefrom Another, a heaven body ball is also a teach tool and the map of a heaven body are depicted thereon. However, general terrestrial globes and heaven body balls are static without any variation and are manufactured separately. Thus, there is an eager demand for a varied terrestrial globe. Thereby, it can present many vivid variations so that the viewer will be interested.

SUMMARY OF THE INVENTION

Accordingly, the primary object of the present invention is to provide a touch controlled light emitted two balls instrument comprising the following elements. A seat with a two loops touch controlled sensing switch circuit system, one side of the seat is formed with a pivotal hole, and the opposite side of the seat is installed with a through hole used to mount with a first light source. A supporting frame is a cambered rod having an approximate C shape and is assembled on the pivotal hole of the seat. A screw rod is mounted on the top of the rod and an engaging rod is projected from the lower end thereof and may be pivotal connected with a second light source. A globe is a hollow and transparent round ball and a world map is depicted on the surface thereof. Holes are formed on the upper and lower ends thereof for being inserted by the screw rod and convex shaft of the supporting frame and a first light source. A heaven body ball is a transparent round ball with a hollow inner space, a heaven body map is depicted thereon. Holes are installed on the upper and lower ends thereof for being inserted by the fixing stud on the lower end of the engaging rod and for being passed through by the first light source and then the first light source will be positioned on the ball pad so to be assembled between the supporting frame and the seat. Therefore, by the touch controlled light emitting two balls instrument within the seat to control the switching of the two light sources, a four stages illumination effects will be generated.

The various objects and advantages of the present invention will be more readily understood from the following detailed description when read in conjunction with the appended drawing.

DETAILED DESCRIPTION OF THE PREFERRED EMBODIMENTS

The touch controlled light emitted two balls instrument of the present invention is shown in the appended figures and comprising a seat (1), a supporting frame (4), a terrestrial globe (6) and a heaven body globe.

Figure 1:
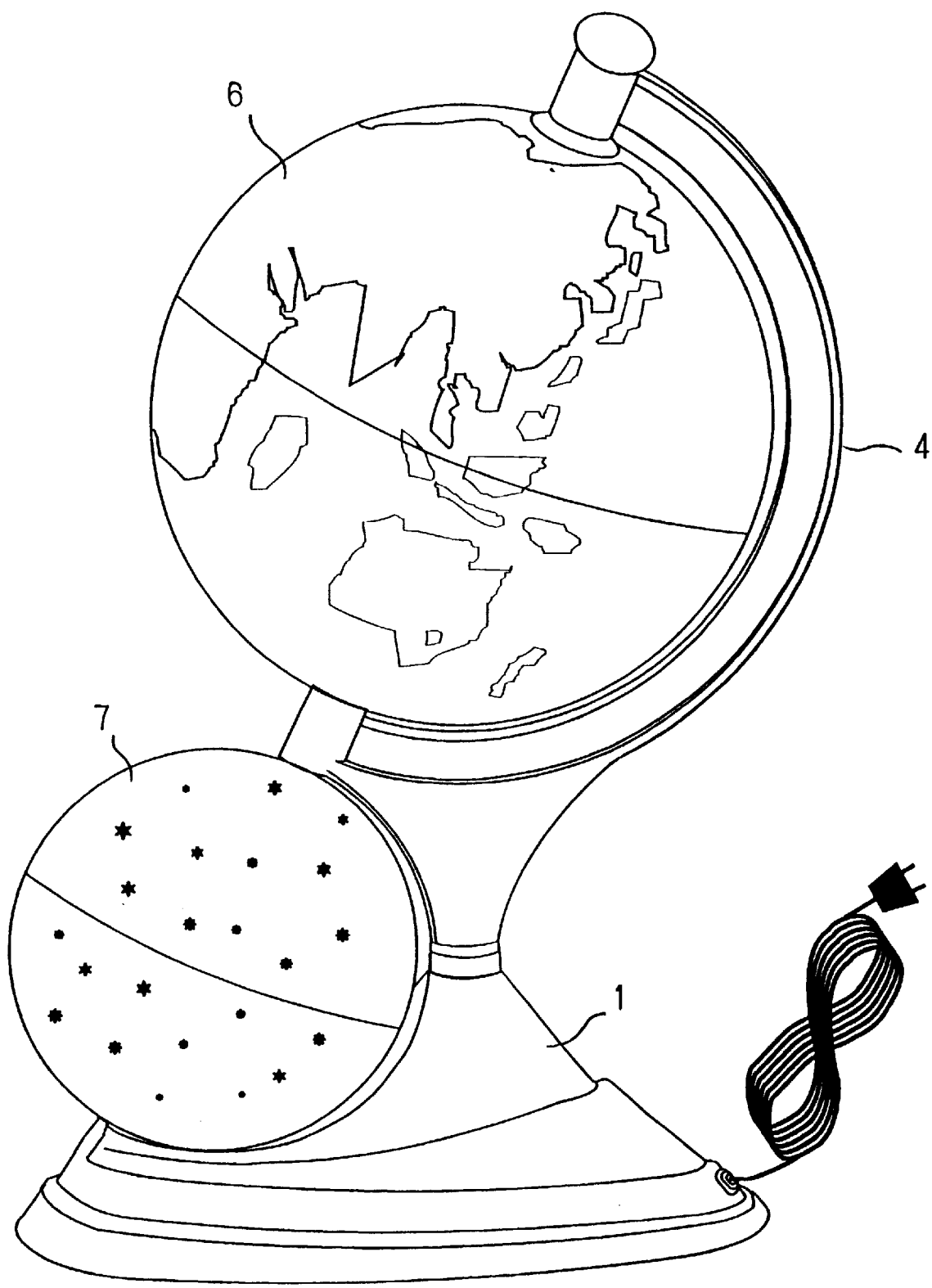
FIG. 1 is a schematic perspective view of the present invention.
Figure 2:
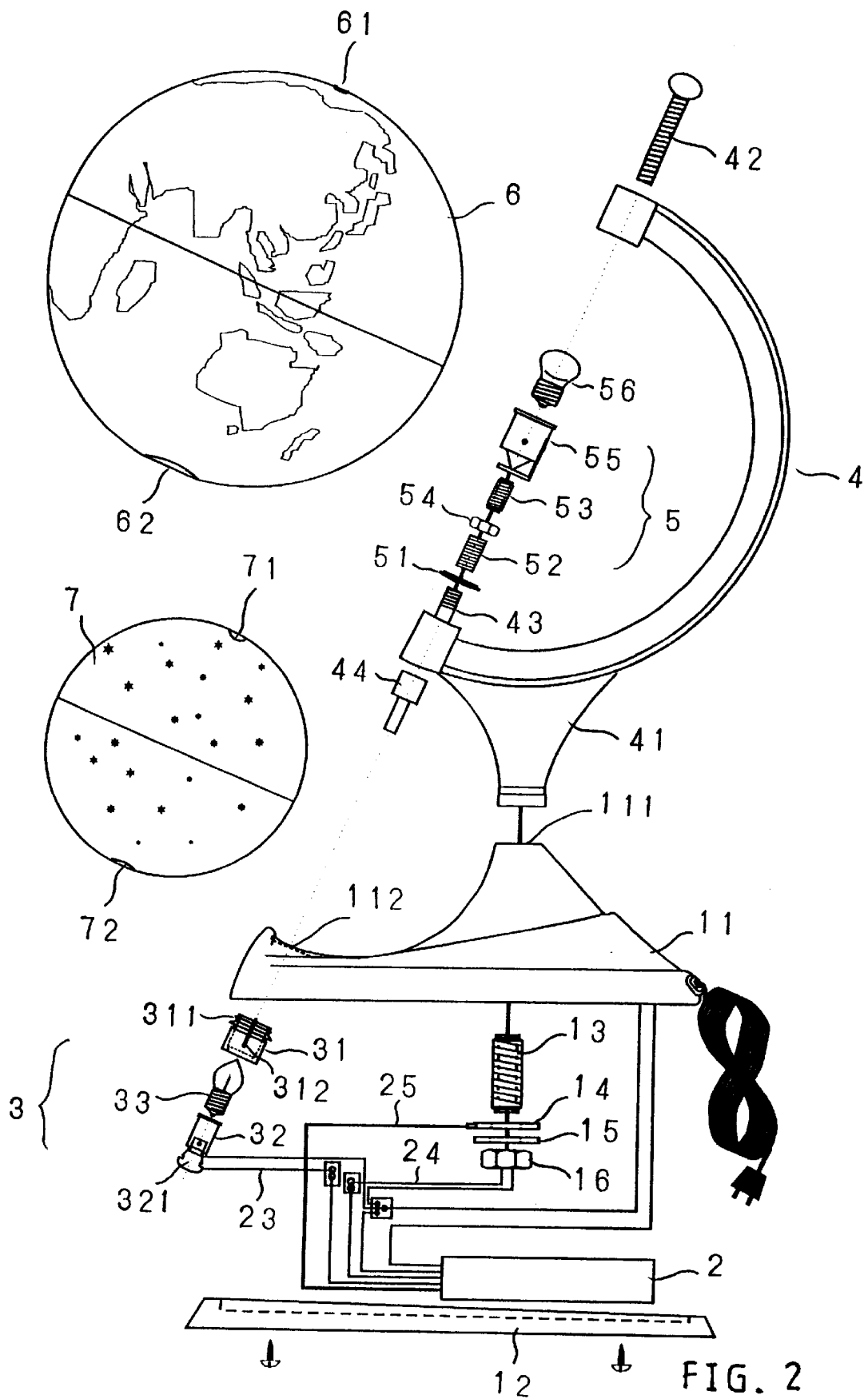
FIG. 2 is an exploded view of the present invention.
Figure 3:
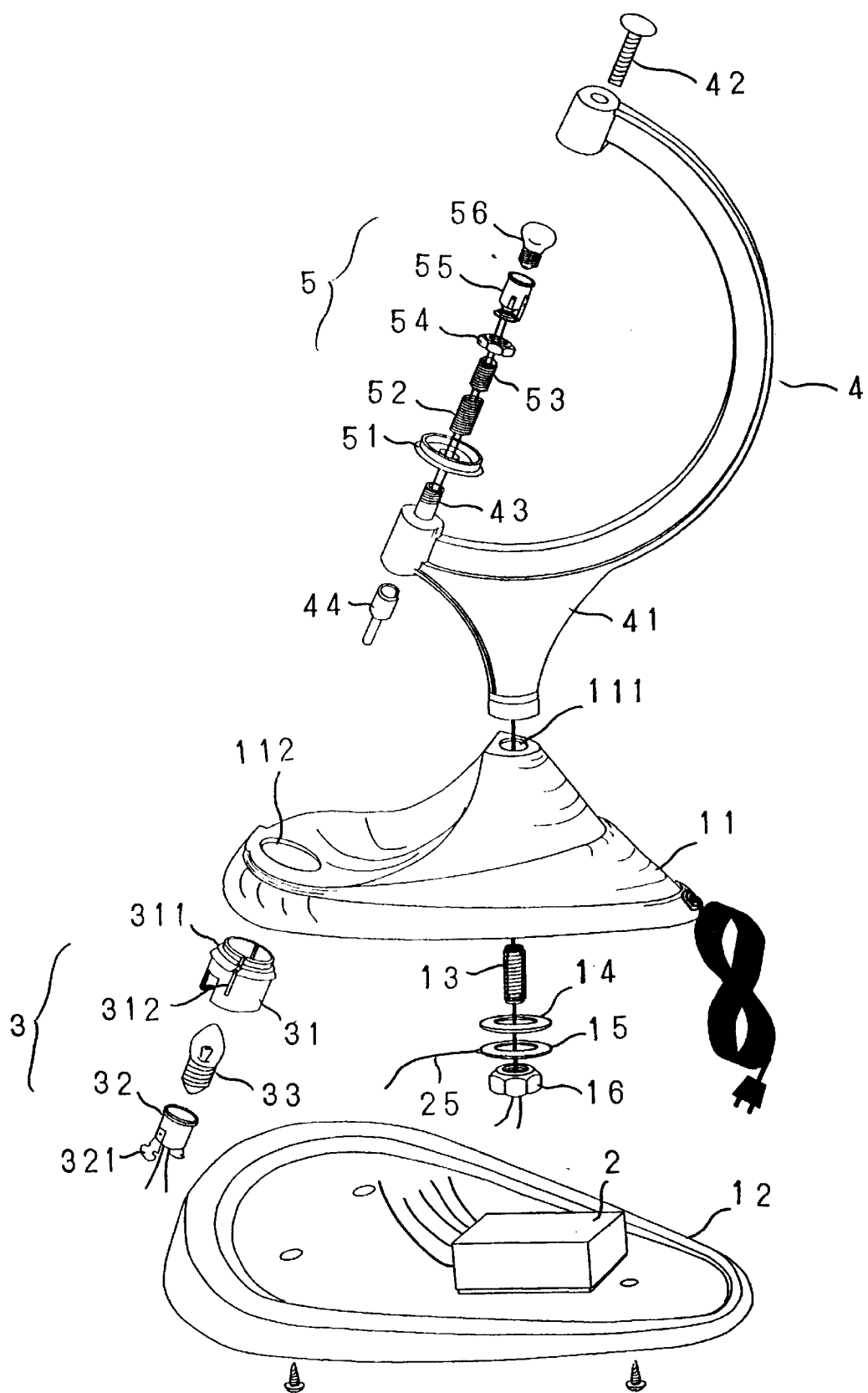
FIG. 3 is an exploded and schematic perspective view of the supporting frame, first and second light source of the present invention.
Figure 4:
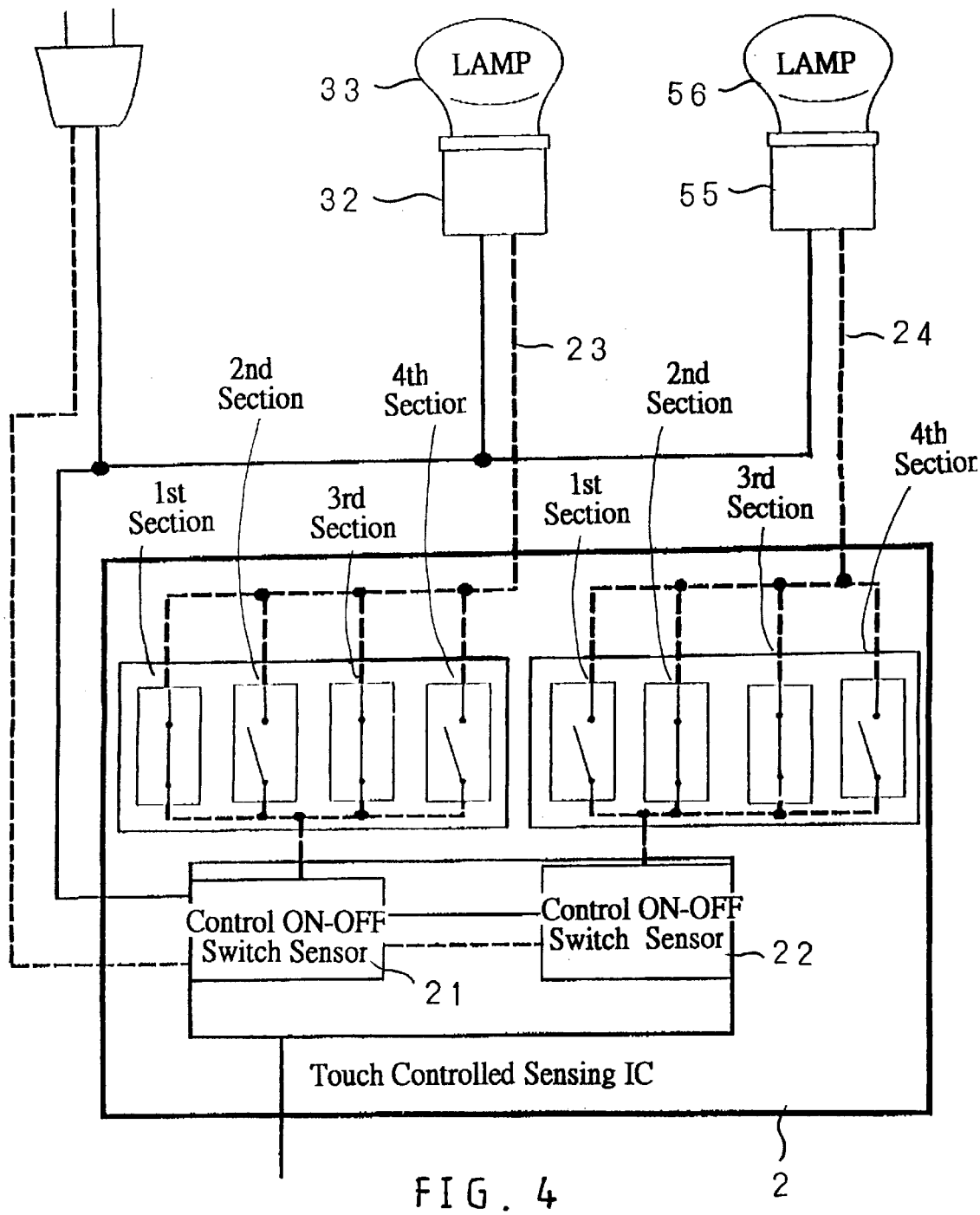
FIG. 4 is a schematic view showing the two loop touch controlled sensing switch circuit.

The seat (1) is formed by a conductive upper cover (11) and a conductive lower cover (12). A touch controlled sensing circuit system (2) is installed therewithin, as shown in FIGS. 2 and 4. The touch controlled sensing circuit system (2) includes two switch sensors (21) and (22) for controlling the ON and OFF of a plurality of bulbs. The two sensors (21) and (22) are connected to two bulb bases (32) and (55), and then are connected to a conductive washer (14). By the washer (14) to contact with the conductive seat (1), the seat (1) and the conductive supporting frame thereabove can be conducted by touch controlling, this is a dual loop touch controlled switch circuit. When the seat is touched by fingers, the circuit will be conducted, and a four stages sequence is generated to control the switching of two powers of two bulbs so that they can light up simultaneously or sequentially. The action will be described hereafter. Moreover, a pivotal hole (111) is formed on one side of the seat (1) and a penetrating hole (112) is formed on an opposite. The pivotal hole (111) can be passed through by a threaded tube (13) so as to be screwedly fixed to the lower end of the pivotal portion (41). A plurality of washers (14) and (15) are covered on the threaded tube (13) and then a nut (16) is locked so that the seat (1) is fixed to the lower end of the pivotal portion (41) of the supporting frame. The penetrating hole (112) is further installed with a ball pad (31) the upper end of which is installed with a convex ring (311) and a longitudinal long groove (312). By the structure of the longitudinal long groove (312), the upper portion of the ball pad (31) is elastic so that the convex ring (311) on the top end of the ball pad (31) can pass through the penetrating hole (12), and thus the ball pad (31) is compressed in the penetrating hole (112) so to be positioned and thus pad can bear a ball (7) and a light source (3). The first light source (3) includes a bulb base (32) and a bulb (33). The bulb base (32) passes through the ball pad (31) and by two reeds (321) thereof to reject the inner rim of the lower portion of the ball pad (31), therefore, the first light source (3) is positioned. The bulb (33) is screwedly connected to the bulb base (32) so that the ball (7) will light up.

The supporting frame (4) is a conductive cambered rod having an approximate C shape. The supporting frame (4) is formed by the pivotal portion (41) on the lower end of which the threaded tube (13) passes through the pivotal hole (11) of the seat (1). A screwed rod (42) may be installed on the top end of the supporting frame and the lower end thereof is projected with an engaging rod (43). The engaging rod (43) serves to be pivotally connected to a second light source (5). The second light source (5) includes an under-pan (51), a spring (52), a threaded tube (53), a nut (54), a bulb base (55) and a bulb (56). In assembling, the under-pan (51) is engaged on the lower portion of the engaging rod (43). While one end of the spring (52) is engaged on the top end of the engaging rod (43). Another end of the spring (52) serves to be screwedly connected by the threaded tube (53) for being connected with the bulb base (55), and then a nut (54) serves to tightly lock this structure. The bulb base (55) serves to receive a bulb (56) so that the globe (6) will light up. Moreover, the lower end of the engaging rod (43) has a projected fixing stud (44) for assembling with a ball (7).

The globe (6) is a transparent round ball with a hollow inner space, a world map is depicted on the surface of the ball (1). Pivotally holes (61) and (62) are formed on the upper and lower ends of the ball. The hole (61) serves to be inserted by the screw rod (42) on the top end of the supporting frame (4). The second light source (5) may pass through the hole (62) on the lower portion of the globe by the flexibility and elasticity of the spring (52) so as to be installed within the globe (6). The hole on the lower portion of the globe is arranged on the under-pan (51) so that the globe is assembled on the supporting frame (4).

The heaven body ball (7) is a transparent round ball with a hollow inner space, a heaven body map is depicted thereon. Holes (71) and (72) are installed on the upper and lower ends thereof for being inserted by the fixing stud (44) on the lower end of the engaging rod (43) and for being passed through by the first light source (3) and then the first light source will be positioned on the ball pad (31) so to be assembled between the supporting frame (4) and the seat (1).

Therefore, in the touch controlled light emitting two balls instrument according to the present invention, a supporting frame (4) is firmly installed on the seat (1) for engaging and supporting a terrestrial globe (6), and a heaven body ball (7) is formed between the seat and the supporting frame. Two light sources (3) and (5) are installed within the terrestrial globe (6) and the heaven body ball (7). By the touch controlled sensing circuit system (2) within the seat (1) to control the switching of the two light sources, a four stages illumination effects will generate.

When the fingers touch the seat, the circuits of the first light source and the second light source are cut off simultaneously or sequentially, now the bulb within the globe and the bulb within the ball will distinguish according to different sequences.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A touch controlled light emitting two balls instrument comprising:

a seat having a touch controlled sensing circuit system therewithin, a pivotal hole being formed on one side of the seat and a penetrating hole being formed on an opposite, the penetrating hole being further installed with a ball pad for bearing a first light source, the first light source including a bulb base and a bulb, the bulb base passing through the ball pad; by two reeds thereof to reject the inner rim of the lower portion of the ball pad, the first light source being positioned, the bulb being screwedly connected to the bulb base so that an astroscope ball thereon will light up; the touch controlled sensing circuit system including two switch sensors for controlling a plurality of bulbs, the two sensors being connected to two bulb bases and then being connected to a conductive washer, by the washer to contact with a conductive seat, the seat and the conductive supporting frame thereabove can be conducted by touch controlling, this being a dual loop touch controlled switch circuit, wherein when the seat is touched by fingers, the circuit will be conducted, and a four stages sequence is generated to control the switching of two powers of two bulbs so that they can light up simultaneously or sequentially;

a supporting frame being a conductive cambered rod having an approximate C shape and installed on the pivotal hole of the seat for bearing a globe, the lower end thereof being projected with an engaging rod, the engaging rod being used to pivotally connect to a second light source, the second light source including an under-pan and a spring installed on the top end of the engaging rod, one end of the spring being engaged on the top end of the engaging rod, another end of the spring serving to be screwedly connected by a threaded tube for being connected with one of the bulb bases, and then a nut serves to tightly lock this structure, the bulb base serving to receive the bulb so that the globe will light up;

a globe being a transparent round ball with a hollow inner space, a world map being depicted on the surface of the transparent ball, and the globe being engaged on the C shape frame;

a heaven body ball being a transparent round ball with a hollow inner space, a heaven body map being depicted thereon, and the heaven body ball being engaged between the supporting frame and the base.

* * * * *